May 1, 1934. E. F. OYSTER 1,957,287
MOLDING MACHINE
Filed Dec. 2, 1932 2 Sheets-Sheet 2

INVENTOR.
Earl F. Oyster
BY
Fay, Oberlin & Fay
ATTORNEYS

Patented May 1, 1934

1,957,287

UNITED STATES PATENT OFFICE 1,957,287

MOLDING MACHINE

Earl F. Oyster, Shaker Heights, Ohio, assignor to The Osborn Manufacturing Company, Cleveland, Ohio, a corporation of Ohio Application December 2, 1932, Serial No. 645,332

11 Claims. (Cl. 22—9)

This invention relates to a mechanism for use with roller conveyor systems which transport articles to and from molding machines. More particularly the invention relates to a roller conveyor section which is so mounted as to be free from any of the motions of such machines.

In molding machines of the squeeze type either with or without jolt, as previously constructed, the mold formed on the machine is received by a roller conveyor section and is pushed off this section onto the main roller conveyor leading away from the machines. The section positioned within the mold machine rests on a reciprocable table with provision for a small amount of relative vertical movement between the section and the table so that the mold may be squeezed without involving the conveyor section, but the section necessarily has imparted to it the motion of the table during a squeezing operation or a jolting operation since it rests on the movable table. Such movement or jolting of the rollers increases wear and results in more frequent renewal than is considered satisfactory. Another problem arising from this construction is that foundry sand piles around the rollers and requires removal by hand from time to time. The present invention has for its purpose provision of a construction which avoids these disadvantages in molding machines, particularly those of the jolt-squeeze type.

It is, accordingly, an object of the present invention to provide a roller conveyor in a molding machine which roller conveyor is not subject to the functional motion of the machine. Another object of the invention is to provide a roller conveyor section which is stationarily mounted but is adapted for delivering a mold from a molding machine. A further object of the invention is to provide a roller conveyor section and a mold table in non-contactual relation, but cooperating to perform their respective functions. Still another object of the invention is to provide a mold table having increased effective squeezing contact surfaces. To the accomplishment of the foregoing and related ends, said invention, then, consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

Figure 1:
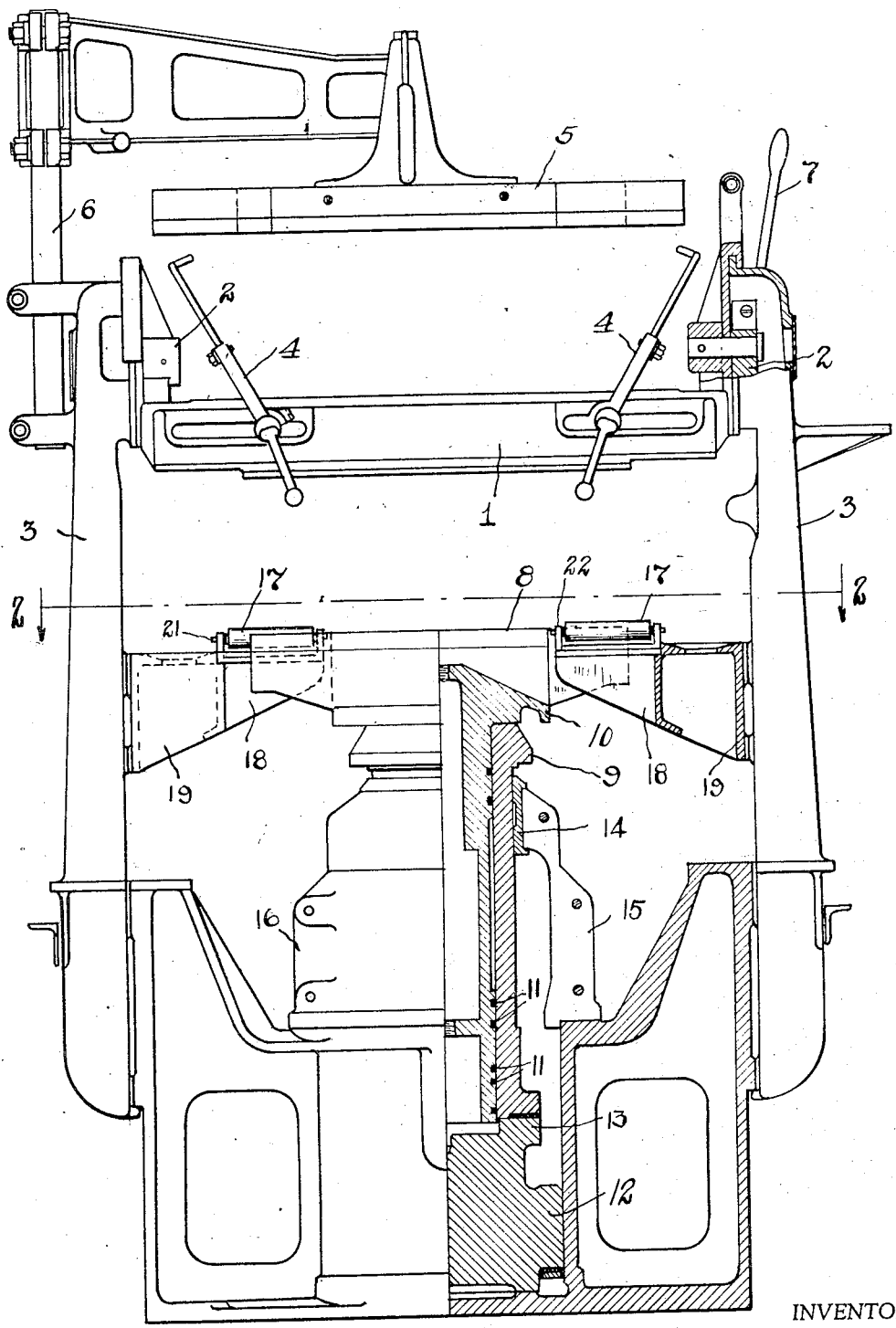
Figure 2:
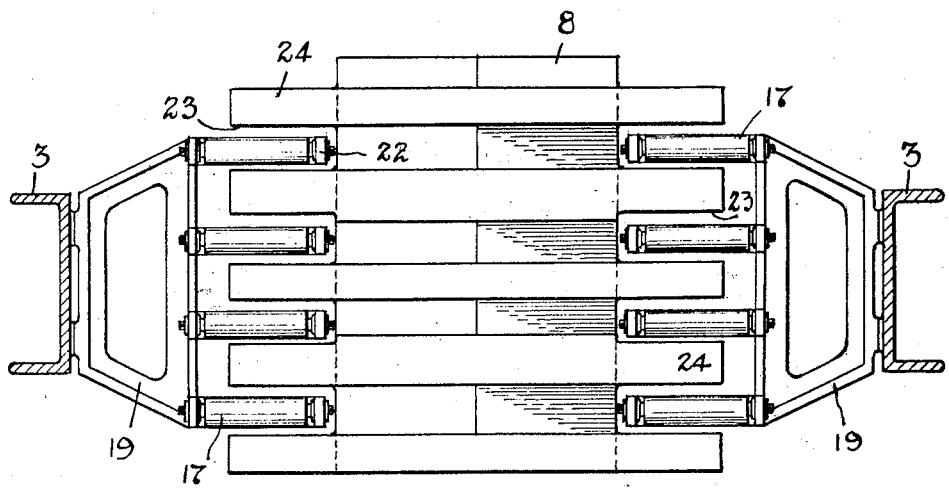
Figure 3:
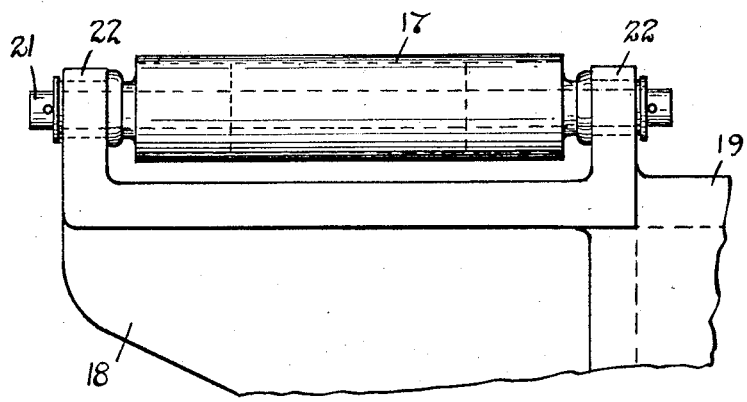

In said annexed drawings:

Fig. 1 is a front elevation, partly in section, showing a standard type molding machine equipped with my roller conveyor section of improved characteristics; Fig. 2 is a section taken along the line 2—2 of Fig. 1; and Fig. 3 is an enlarged detail view of a roller and mounting means.

Referring to the drawings, a rollover table 1 is revolubly mounted on trunnions 2—2 carried by the upper ends of side frames 3—3. Clamps 4—4 serve to hold a flask and mold on the rollover table when the same is inverted, and a strike-off bar 5 mounted on a support post 6 is used for striking off the sand from the flask before a bottom board is put on. A handle 7 operates the rollover mechanism for turning the table 1 on the trunnions 2—2.

A jolt table 8 is positioned below the rollover table and is operated for jolting by the jolt piston 10 acting in a cylinder 9. The piston 10 is provided with rings 11 between it and the inner wall of the cylinder 9. Suitable valve means (not shown) cause the jolt piston to travel up and down quickly with a short stroke when compressed air is turned on.

A squeeze piston 12 underlies the jolt piston and is constituted by the underlying part 13 and the jolt cylinder 9 which works as a piston in the bushing 14 when compressed air is applied for the squeezing operation. This bushing is mounted on squeeze piston guides 15 and 16, which are made in halves and bolted onto the main frame.

In the operation of the machine, as described up to this point, the flask is placed on the rollover table 1 and sand filled in around the pattern positioned therein. The jolt piston 10 and jolt table 8 are then reciprocated so as to strike the bottom of the rollover table repeatedly and jolt the sand in the flask so as to ram the same uniformly around the pattern. The jolt table rises somewhat before beginning the jolting action. The sand is then struck off by the strike-off bar 5, a bottom board is set in place, and the clamps 4—4 are applied. The flask is then inverted by reversing rollover table 1 by means of the handle 7 so that the flask now rests on the jolt table 8. Squeeze is applied by means of the squeeze piston 12, to which compressed air is appropriately applied and the clamps are readily removed upon the completion of the squeezing operation due to the fact that the sand has been compressed and the bottom board forced closely against the edges of the flask, thus releasing the board from engagement with the clamps.

At this point, the flask and mold are drawn away from the pattern by lowering the squeeze piston and the mold rests on a section of a roller conveyor system and may be pushed on to such system. In previous constructions, the roller conveyor section has been carried on the jolt table with means for dropping it below the surface of such table during jolting or squeezing, with the result that the roller conveyor section was jolted along with the table.

In the present construction, this undesirable feature, resulting in wear and frequent replacement, is done away with by mounting the rollers 17 constituting the operating surface of the conveyor section, on the main frame 3 out of contact with the jolt table. This is done by providing cantilever supports 18, one for each roller, and carried by brackets 19 attached to the main frame. The rollers are mounted on shafts 21 which turn in journals 22 on the cantilever supports 18.

The conveyor rollers are thus stationarily mounted on the frame and extend inwardly so as to be positioned to receive a mold from the jolt table when the drawing operation has been completed. It is necessary, however, that the jolt table 8 should be free to move up and down to assume the jolting position and also to apply the squeeze. This is provided for by making the jolt table with recesses or slots 23 which interfit with the rollers 17 and thus permit the jolt table to move up and down without interference from the stationarily mounted rollers. From another point of view, the jolt table may be considered to be provided with extensions 24 which prolong the squeezing contact surfaces of the jolt table outwardly toward either main frame of the machine. In this way, the force of the squeezing is more widely distributed over the bottom board and this latter is not subjected to as great localized strains with resulting distortion as would be the case with a smaller effective squeezing surface, although the total force applied to the mold is not affected.

It will be seen that the above described stub end cantilever rollers 17 are supported at both ends by the cantilever mounting 18, but are attached to the main frame through this mounting and the bracket 19, at only one end, the rollers projecting out from the main frame at either side and leaving a central space for the free vertical movement of a jolt table. The slots 23 in the jolt table clear the rollers and there is no contact at any time between the table and the conveyor section. In this way, no jolting of the rollers occurs and they are subject only to such vibration as may be transmitted through the main side frames of the machine. A further advantage of the present construction is found in the fact that the rollers are so positioned that foundry sand will not build up around them as was the case with rollers resting on the jolt table where sand would pile up and require frequent removal by hand.

The present construction thus provides a conveyor section so constructed and mounted that functional movement of the machine is not imparted to the conveyor section while the construction also results in increased effective squeezing area of a mold table. The construction is advantageous in any molding machine where a flask must be conveyed to and from a mold table and is particularly useful in connection with molding machines where a squeeze is applied to the mold or where such mold is jolted.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:

1. In a molding machine, a roller conveyor section stationarily mounted on said machine and a mold table movable through said conveyor section.

2. In a molding machine, a roller conveyor mounted on said machine, out of contact with elements subject to reciprocation, and positioned for delivering a mold from said machine.

3. In a molding machine, a roller conveyor mounted on said machine out of contact with a reciprocable table and positioned for delivering a mold from said reciprocable table.

4. In a jolt squeeze molding machine, a roller conveyor section adapted for delivering a mold from a jolt table, means mounting said conveyor section out of contact with said jolt table, and apertures in said conveyor section for vertical movement of said jolt table therethrough.

5. In a molding machine, a roller conveyor section stationarily mounted on said machine, and a mold table vertically movable through said conveyor section, said roller conveyor being positioned for delivering a mold from said table.

6. A molding machine having in combination a roller conveyor section including rollers supported on the frame of said machine, and a mold table adapted to be reciprocated without moving said conveyor section.

7. A molding machine having in combination a roller conveyor section including rollers supported on the frame of said machine by a cantilever mounting, and a mold table adapted to be reciprocated without moving said conveyor section.

8. In a molding machine, a roller conveyor section stationarily mounted on said machine and comprising rollers attached to either side of the molding machine frame, and extensions on a mold table interfitting with said rollers.

9. In a molding machine, a roller conveyor section stationarily mounted on said machine, and comprising rollers attached to either side of the molding machine frame by cantilever supports and extending inwardly toward a jolt table, and extensions on said jolt table interfitting with said rollers but out of contact therewith.

10. In a jolt squeeze molding machine, a roller conveyor section stationarily mounted on said machine, a jolt table in non-contactual relation to said conveyor section, said conveyor section being positioned to deliver a mold from said jolt table, and extensions on said jolt table interfitting with said rollers and extending the squeezing surface of the table to a width approximating the distance between the sides of the machine.

11. In a molding machine, a roller conveyor section stationarily mounted on said machine, a mold table movable through said conveyor section, and extensions on said table increasing the flask-engaging area of said mold table.

EARL F. OYSTER.